May 3, 1932. J. H. SMITH 1,856,973
QUICK CHANGE CHUCK
Filed Feb. 6, 1930
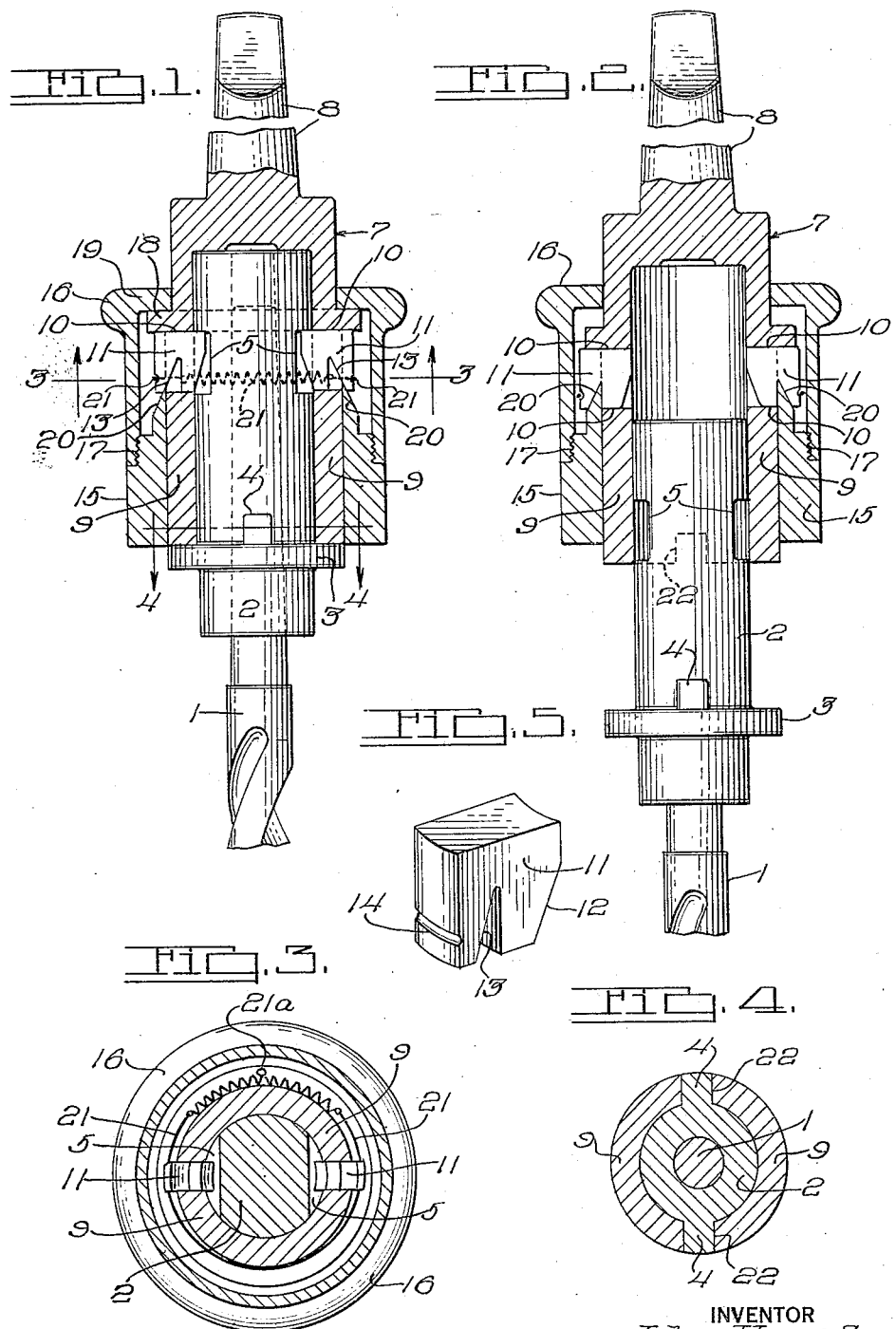
INVENTOR
John Hugo Smith
by Stuart C. Barnes
ATTORNEY Patented May 3, 1932

1,856,973

UNITED STATES PATENT OFFICE

JOHN HUGO SMITH, OF DETROIT, MICHIGAN

QUICK CHANGE CHUCK

Application filed February 6, 1930. Serial No. 426,258.

This invention relates to quick change chucks, and has to do particularly with an extremely simple and compact tool holder embodying tool securing and releasing means.

Quick change chucks, or what might be termed "tool holders" having easily removable collets, are in quite general use and the most successful of such type tool holders have embodied some means which may be actuated while the tool holder is still in motion to release the collet and working tool and which means may also be actuated while the tool holder is still in motion to permit the collet in a new tool to be inserted into position. Thus, not only has this general type of quick change chuck required two separate operations in the changing of tools, but so far as I am aware, such chucks have embodied a complicated and expensive design.

It is the object of the present invention to provide a quick change chuck which embodies a minimum number of parts, is very easy and inexpensive to manufacture, which requires only one operation in the removal and inserting of the tool, and which is adapted to release or receive a tool regardless of the direction of rotation of the tool holder.

In the drawings:

Fig. 1 is a longitudinal sectional view of a combined tool holder and collet embodying my invention.

Fig. 2 is a view similar to Fig. 1 but illustrating the manner of actuating a part of the chuck whereby to release the collet.

Fig. 3 is a sectional view taken on line 3—3 of Fig. 1.

Fig. 4 is a sectional view taken on line 4—4 of Fig. 1.

Fig. 5 is an enlarged perspective view of one of the novel lug members for controlling the locking and releasing of the collet.

A quick change chuck of the type embodied in the presnt invention usually contains three standard elements; namely, the tool, the collet for holding the same, and the tool holder. In the embodiment illustrated in the drawings, the tool itself may be generally designated 1 and the collet for receiving the same 2. This collet is preferably cylindrical in shape and at the lower end thereof is provided with a collar 3 and diametrically positioned lug members 4. The upper end of the collet 2 is preferably milled away as at 5 and 6 to provide suitable slots for cooperating in the locking and releasing of the collet as will be later pointed out.

The tool holder may be generally designated 7 and in detail this tool holder consists of the usual tapered shank 8 and a cylindrical downwardly extending hollow portion 9 for receiving the collet. The interior wall of the downwardly extending portion 9 is preferably ground so as to have a close sliding fit with the ground surface of the upper cylindrical end of the collet 2.

This downwardly extending annular portion 9 is also provided with diametrically formed slots 10 which are adapted to receive and position lug members 11. These lug members are fabricated to closely fit and slide within the slots 10 and are each provided with a suitable tapered surface 12 on the inner lower side thereof, a substantially V-shaped groove 13, as best shown in Fig. 5, and a suitable transverse groove 14 on the outer surface thereof.

Adapted to cooperate with the grooves 13 is an outer annular member 15. This member 15 is rotatably mounted on the outer surface of the member 9 and preferably the outer surface of the member 9 and the inner surface of the member 15 are ground so as to provide for easy relative rotation between the two members.

The member 15 is adapted to be held in position by a collar 16. Such collar 16 and the member 15 are fabricated for threaded engagement as at 17 and the tool holder 7 is preferably provided with a suitable flange 18 for rotatably receiving an inwardly extending flange 19 of the collar 16. It will thus be seen that the entire casing or shell formed by the member 15 and the collar 16 is rotatably positioned relative to the tool holder 7 so that if such casing or shell is grasped by the hand it will remain stationary while the main portion of the tool holder continuously rotates in either direction.

The upper end of the member 15 is preferably tapered as at 20 and this tapered portion 20 is adapted to remain in constant engagement with a portion of the V-shaped slot 13 in each of the lugs 11. Such lugs 11 are subjected to a constant spring pressure by means of a partially coiled spring 21 which encircles the lower end 9 of the tool holder and is held in position by a pin 21a and engages the lugs at the grooves 14. It will thus be seen that the lug members 11 are normally forced inwardly.

Thus upward movement of the shell member, consisting of the parts 15 and 16, will result in the tapered portions 20 fully entering the V-shaped grooves 13 of the lug 11 causing outward radial movement of said lugs and inasmuch as the lug members 11 are the sole means for holding the collet and its tool in position, it will be obvious that sufficient upward movement of the member 15 will result in complete release of the collet.

The tapered portion 12 of the lug members 11 is so designed that the lower edge of the taper 12, when the lugs are in innermost position, as shown in Fig. 1, will just register with the inner surface of the member 9. In other words, when the member 15 is in lowermost position, regardless of whether the collect is in position or not, the lug members will be in the position shown in Fig. 1. The lower end of the annular extension 9 is provided with diametrically positioned slots 22 and these slots 22 are adapted to receive the lug members 4 of the collet so that the actual driving takes place between the tool holder and the collet at this point.

In operation of my quick change chuck, and assuming a tool and its collet is in position as shown in Fig. 1, and that the machine is operating, it will be obvious that in order to release the collet it is only necessary for the operator to grab the rotatable shell member and then move the same upwardly. This rotatable shell member when grasped will, of course, remain stationary without affecting any other parts, but the moment it is moved upwardly to sufficient extent, the lug members 11 will be forced outwardly, as shown in Fig. 2, and the collet immediately released. The operator will grasp the released collet and its tool with his other hand. In inserting another tool and its collet into position, it is only necessary for the operator to insert the collet into the rotating chuck, as shown in Fig. 2, and move the same upwardly until the lug members 4 register with the slots 22 when the collet may be forced home with one hand. The upper end of the cylindrical member 2 will contact with the tapered surface 12 of the lug members and force the same outwardly until said lug members again return to their locking position, as shown in Fig. 1.

What I claim is:

1. A tool of the character described, comprising a chuck having an annular collet receiving member and diametrically positioned slots for receiving engaging and releasing lugs, means normally tending to move said lugs inwardly, a flange on said annular member, and a rotatable sleeve member formed in two parts, one part engaging said flange to hold said sleeve in position on the chuck and the other part having means for engaging said lugs to move the same outwardly when said sleeve is moved in an axial direction, said lugs being freely movable independently of said sleeve when said sleeve is in normal position whereby to be automatically actuated when said collet is moved into position.

2. A tool chuck comprising a hollow collet-receiving member having slots therein, radially slidable lugs in the slots, a collet for disposition within the member notched to receive the lugs, means urging the lugs radially inwardly to lock the collet in said member, a collar outside said member axially movable thereon, a cam surface on each lug, and cam means on the collar coacting with the cam surfaces on the lugs to retract them from engagement with the collar upon axial movement of the collar.

3. A tool chuck comprising a hollow collet-receiving member having slots therein, radially slidable lugs in the slots, a collet for disposition within the member notched to receive the lugs, means urging the lugs radially inwardly to lock the collet in said member, a colar outside said member axially movable thereon, a cam surface on each lug, and cam means on the colar coacting with the cam surfaces on the lugs to retract them from engagement with the collar upon axial movement of the collar, said means for holding the lugs radially inwardly comprising a spring.

4. A tool chuck comprising a hollow collet-receiving member having slots therein, radially slidable lugs in the slots, a collet for disposition within the hollow member notched to receive the lugs, a cam surface on each lug, a collar rotatably mounted on said member and axially movable with respect thereto, a frusto-conically shaped member carried by the collar, the conical surface of which coacts with the cam surfaces on the lugs whereby to retract them from engagement with the collet upon axial movement of the collar.

5. A tool chuck comprising a hollow collet-receiving member having slots therein, radially slidable lugs in the slots, a collet for disposition within the hollow member notched to receive the lugs, a cam surface on each lug, a collar rotatably mounted on said member and axially movable with respect thereto, a frusto-conically shaped member carried by the collar, the conical surface of which coacts with the cam surfaces on the lugs whereby to retract them from engagement with the collet upon axial movement of the collar, said lugs being radially movable outwardly independently of the collar and said lugs having other cam faces for engagement with the collet whereby insertion of the collet within said member cams the lugs outwardly.

6. A tool chuck comprising a hollow collet-receiving member, a notched collet therein, said hollow member having slots therein, a radially slidable lug in each slot, spring means for urging the lugs inwardly to engage the notched portion of the collet, a cam surface on the inner edge of each lug for camming the lugs outwardly upon entrance of the collet, another cam surface on each lug, a sleeve outside said member having cam means for coacting with the second named cam surfaces on the lugs, said sleeve being axially movable whereby the coacting surfaces on the lug and sleeve move the lugs radially outwardly for collet release.

7. A tool chuck comprising a hollow collet-receiving member provided with slots, a lug in each slot, a notched collet, spring means for urging the lugs into the notched collet, cam surfaces on the inside edge of each lug for automatic lug actuation upon insertion of the collet, a V shaped notch in each lug, an axially movable sleeve outside said member and rotatable thereon having a frusto-conical part engaged in the V shaped notches, said frusto-conical surface contacting with one side of the V shaped notches upon axial movement of the sleeve to move the lugs radially outward for collet release.

8. In a tool of the character described, the combination of a collet, a receiving chuck having radially movable lug members for positioning or releasing the said collet, said lug members having a cam surface, and a freely rotatable sleeve having a cam surface, mounted on said chuck and movable axially of the tool, an axial movement of the sleeve causing the cam surface of the sleeve to press against the cam surface of the lugs resulting in a radially outward movement of the lugs releasing the collet.

9. In a tool of the character described, the combination of a collet, a receiving chuck having radially movable lug members for positioning or releasing the collet, said lug members having a cam surface, means for pressing the lugs radially inward engaging the collet, a freely rotatable sleeve having a cam surface, mounted on said chuck and movable axially of the tool, an axial movement of the sleeve causing the cam surface of the sleeve to press against the cam surface of the lugs resulting in a radially outward movement of the lugs releasing the collet, and interengaging means on said chuck and said collet for effecting driving of the collet.

10. In a tool of the character described, the combination of a collet, a receiving chuck having radially movable lug members for positioning or releasing the said collet, said lug members having a notch, means for pressing the lugs radially inward engaging the collet, and a freely rotatable sleeve having a cam surface, mounted on said chuck and movable axially of the tool, an axial movement of the sleeve causing the cam surface of the sleeve to press against one surface of the notch in each lug resulting in a radially outward movement of the lugs releasing the collet, and interengaging means of said chuck and said collet for effecting driving of the collet in either direction independently of said positioning and releasing lugs.

In testimony whereof I affix my signature.

JOHN HUGO SMITH.